United States Patent [19]

Brachear

[11] Patent Number: 4,607,449
[45] Date of Patent: Aug. 26, 1986

[54] FISHING JUG

[76] Inventor: Howard Brachear, 12 Sunset Acres, Farmersville, Ill. 62533

[21] Appl. No.: 737,710

[22] Filed: May 28, 1985

[51] Int. Cl.[4] .............................................. A01K 97/12
[52] U.S. Cl. .................................... 43/43.11; 43/42.22
[58] Field of Search ..................... 43/4, 42.22, 43.11, 43/43.12, 15, 1, 41.2, 44.91; 441/6, 23, 24, 28

[56] References Cited

U.S. PATENT DOCUMENTS

| 1,750,842 | 3/1930 | Hren | 43/43.11 |
| 2,603,905 | 7/1952 | Brzezinski | 43/44.9 |
| 3,168,790 | 2/1965 | Creasey | 43/43.11 |
| 3,216,146 | 11/1965 | Johnson et al. | 43/43.11 |
| 3,667,417 | 6/1972 | Clinkenbeard | 441/23 |
| 4,443,203 | 4/1984 | Maertens | 441/28 |

Primary Examiner—M. Jordan
Attorney, Agent, or Firm—McCaleb, Lucas & Brugman

[57] ABSTRACT

A fishing jug comprises a floatable, hollow housing with a generally cylindrical side wall and top and bottom end walls. A hollow, inverted U-shaped handle with a removable seal plug is connected to the top end wall in communication with the interior of the housing. There is a reduced-diameter neck in the lower portion of the side wall having an external, toroidal surface of concave, parti-circular cross-section extending completely around the housing. There is a downwardly enlarged, flared lower ballast compartment between the neck and lower end wall. One or more hook-engageable loops are outstanding from the neck but are entirely recessed within a cylindrical projection of the side wall. The loops are offset from a minimum diameter section of the neck.

3 Claims, 6 Drawing Figures

U.S. Patent     Aug. 26, 1986     4,607,449
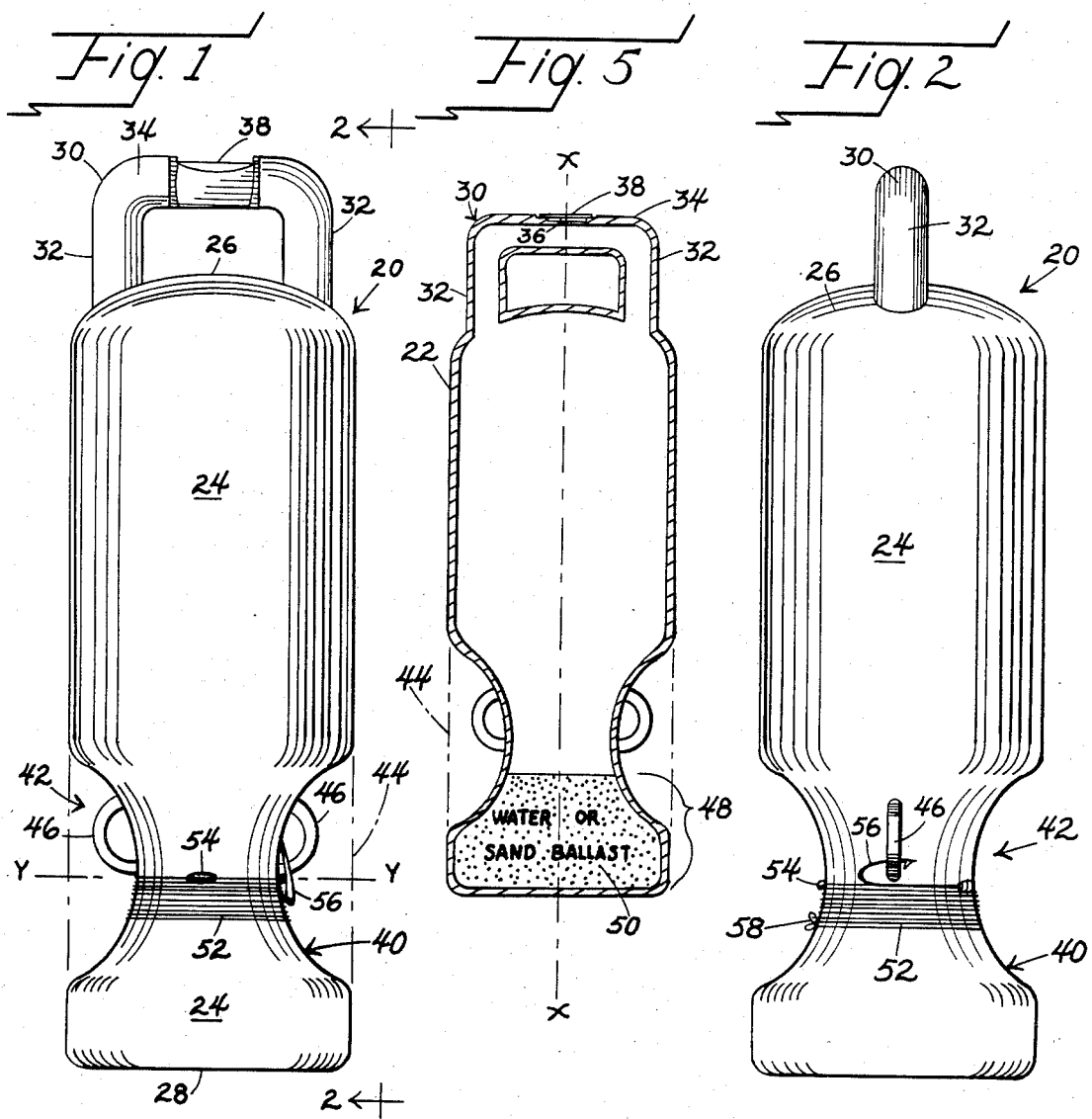
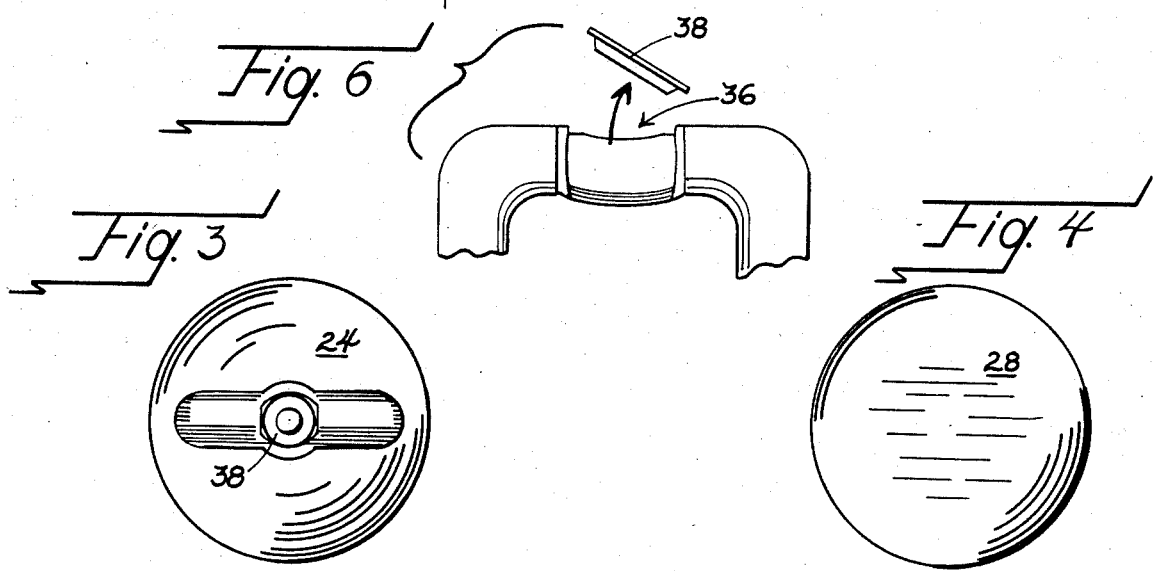

a
FISHING JUG

BACKGROUND OF THE INVENTION

Jug fishing is a very effective way of catching fish, especially catfish. Very little or no experience is required. If a person can bait a hook and row a boat, he can catch fish by this method.

Jug fishing typically involves tying a line with a baited, weighted hook onto the handle of an empty plastic jug of the kind used for packaging milk, bleaching solution, and the like. The jug and line are set adrift in farm ponds, coves, creeks, on lakes, in inlets, and on backwaters of rivers and streams. Rapid bobbing or running of the jug indicates a fish is hooked. The fisherman rows his boat to the jug, retrieves the fish, rebaits the hook and returns the jug to the water.

Many states allow up to 50 jugs per license holder. Handling such a large number of jugs in a boat requires great care to avoid tangling of the lines, both when launching them, and when retrieving them after fishing is concluded.

It is time-consuming and inefficient to bait individual hooks as the jugs are placed in the water while simultaneously handling the oars and occasionally separating tangled lines.

At best, jug fishing has been a makeshift affair using floatation jugs not specifically designed for the purpose and being awkward for one or even two persons to handle in large numbers from a small boat.

SUMMARY OF THE INVENTION

It is a general object of the present invention to provide a fishing jug which is inexpensive to manufacture and easy and efficient to use.

An important object of the invention is to provide a fishing jug with a recess for storing a fishing line with a hook so they will not tangle with lines and hooks on similar fishing jugs stored with it.

An important object of the invention is to provide a fishing jug having a hollow housing with a generally cylindrical side wall and a reduced-diameter neck with hook-engageable means entirely recessed within a cylindrical projection of the side wall so a plurality of jugs with fishing lines can be piled atop one another without tangling the lines and hooks.

Another object is to provide a fishing jug having a downwardly enlarged, flared lower ballast compartment between the neck and a lower end wall.

Another object is to provide such a fishing jug having a handle in the form of an inverted U-shaped tube having two legs attached to a top end wall and communicating with the interior of the housing, and a removable seal plug in the handle enabling ballast to be introduced into or removed from the housing when the seal plug is removed.

BRIEF DESCRIPTION OF THE DRAWINGS

Other objects and advantages will be apparent from the following description taken in connection with the accompanying drawings in which:

FIG. 1 is a side view of a fishing jug illustrating a preferred form of the present invention;

FIG. 2 is a side view of FIG. 1 seen in the direction of arrows 2—2;

FIG. 3 is a top view of FIG. 1;

FIG. 4 is a bottom view of FIG. 1;

FIG. 5 is a vertical cross-section view of FIG. 2, taken along line 5—5; and

FIG. 6 is an enlarged fragmentary view of FIG. 1 with the seal plug removed.

Like parts are referred to by like reference characters throughout the figures of the drawings.

DETAILED DESCRIPTION OF THE PREFERRED EMBODIMENT

Referring now to the specific embodiment of the invention in the drawings, a fishing jug generally designated 20 comprises a floatable hollow housing 22 of any suitable lightweight material such as plastics material. It has a generally cylindrical side wall 24 with a domed top end wall 26 and a flat bottom end wall 28.

An inverted U-shaped, tubular handle 30 has a pair of depending legs 32,32 connected to or integral with the top end wall 26 and communicating with the interior of the housing. The handle has a transverse, intermediate portion 34 with an aperture 36 and a removable seal plug 38.

The cylindrical side wall 24 is discontinuous, comprising upper and lower portions 24 separated by a reduced-diameter neck 40 with a recess 42 within a cylindrical projection 44 of the side wall. More specifically, the outer surface of the neck 40 is here shown as a toroidal surface of concave, parti-circular cross-section extending completely around the housing. The horizontal line Y—Y (FIG. 1) designates the minimum-diameter section of the neck.

A pair of dimetrically opposed loops 46,46 are molded integrally with the housing and located in the recess 42, offset upwardly from the minimum-diameter section at Y—Y as best shown in FIG. 1.

A downwardly enlarged, flared, lower ballast compartment 48 is provided between the minimum-diameter section at Y—Y and the bottom wall 28. Water or sand ballast 50 may be introduced into the ballast compartment or removed therefrom, through the aperture 36 when the seal plug 38 is removed as shown in FIG. 6.

As stated above, some state laws enable use of up to 50 jugs per license holder. An important feature of the invention is that all the jugs may be provided with fishing lines and hooks which are prebaited on shore in preparation for actual fishing. The jugs so baited may be piled randomly against one another in a boat without the lines or hooks snagging one another.

This may be carried out as follows. A length of fishing line 52 will be provided for each jug. Each fishing line has a weight 54 and a suitable hook 56. A loop will be provided in the end of the line remote from the hook by means of a slip knot 58. The looped end of the line will encircle the reduced neck portion 40 and the rest of the line coiled about it as shown in FIGS. 1 and 2 until the hook 56 is slightly beyond one of the plastic loops 46, care being taken to make the adjacent plies of line as close as possible to the minimum-diameter section at Y—Y. The entire coiled line will then be rotated backwardly sufficiently to engage the hook with one of the loops 46 as shown in both FIGS. 1 and 2. It will be appreciated that the coil of line may be rotated in this manner because the plastic body of the jug is smooth and there is no fixed connection between line and jug.

The hook may be baited on shore, or baited in the boat just before casting into the water, as desired. Thus, a large number of jugs may be stacked in a boat with no possiblity of the hooks or lines snagging or tangling with one another. When the fisherman rows out to the fishing location, it is a simple maneuver to rotate the coil of line around the neck 40 in a direction to release the hook from the retaining loop 46. If it is already baited, he can simply cast the jug into the water and the line will unwind itself and lower into a fishing position. A large number of jugs can be cast into the water in a very short time, whether the hooks are pre-baited on shore or whether they are freshly baited just before being cast.

By constructing the neck 40 with the minimum-diameter section at Y—Y clear of the loops 46 (which are offset upwardly in the present example) the coiled fishing line will snugly engage the neck and have a minimal tendency to loosen or to slip axially, that is in the direction of the longitudinal axis X—X shown in FIG. 5.

The embodiment described and shown to illustrate the present invention has been necessarily specific for purposes of illustration. Alterations, extensions and modifications would be apparent to those skilled in the art. The aim of the appended claims, therefore, is to cover all variations included within the spirit and scope of the invention.

The embodiments of the invention in which an exclusive property or privilege is claimed are defined as follows:

1. A fishing jug comprising: a floatable hollow housing having a generally cylindrical side wall;
   top and bottom end walls at opposite ends of said housing;
   a handle connected to the top end wall;
   said side wall having a reduced diameter neck portion in the lower portion of the side wall providing a downwardly enlarged, flared lower ballast compartment between the neck portion and the bottom wall; and
   hook engageable loop means extending outwardly from the neck portion of the side wall and being entirely recessed within a cylindrical projection of the side wall;
   whereby a plurality of the fishing jugs may be piled or stacked with lines having baited hooks wrapped around the neck portion and the hooks may be temporarily held by the respective hook-engageable loop means within the neck portion without snagging or tangling the lines or hooks.

2. A fishing jug according to claim 1 in which the neck portion has an external, toroidal surface of concave parti-circular cross-section extending completely around the housing, said hook-engageable loop means being offset from a minimum-diameter section of the neck portion enabling a fishing line to be wrapped stably without axial slippage around said minimum diameter section with a hook on the line held by the hook engageable loop means.

3. A fishing jug comprising:
   a floatable hollow housing having a generally cylindrical side wall;
   top and bottom end walls at opposite ends of said housing;
   a handle connected to the top end wall, said handle comprising an inverted U-shaped tube having two legs attached to the top end wall and communicating with the interior of the housing, and a removable seal plug in said handle enabling introduction or removal of ballast into or from said housing through the handle;
   said side wall having a reduced diameter neck in the lower portion of the side wall providing a downwardly enlarged, flared lower ballast compartment between the neck and the bottom wall; and
   hook-engageable means in said neck entirely recessed within a cylindrical projection of the side wall;
   whereby a plurality of the fishing jugs may be piled or stacked with lines having baited hooks wrapped around the neck and the hooks may be temporarily held by the respective hook-engageable means without snagging or tangling the lines or hooks.

* * * * *